Figure 1:
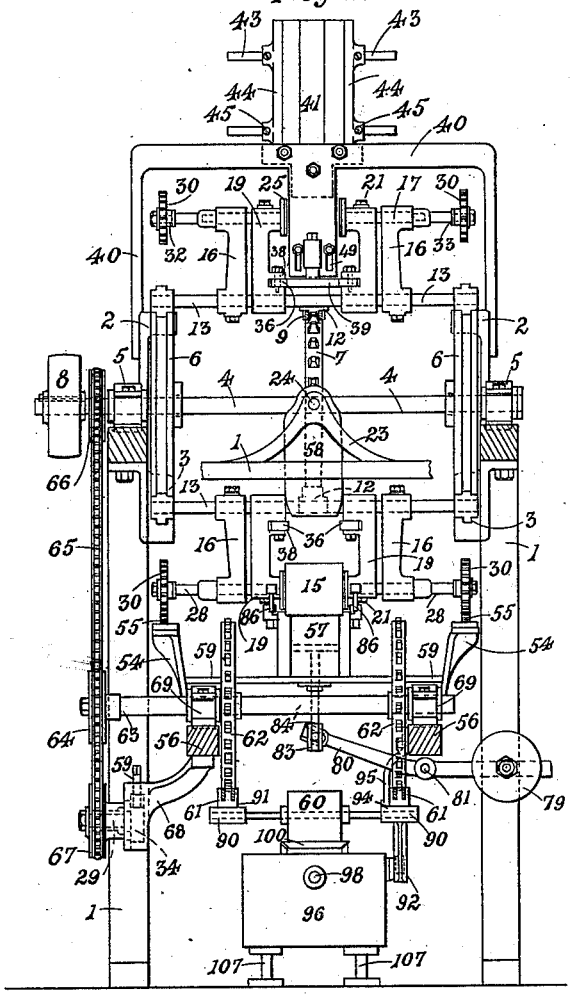

No. 671,352. Patented Apr. 2, 1901.
E. RANKIN.
APPARATUS OR MACHINERY FOR LABELING CANS, BOTTLES, JARS, OR THE LIKE.
(Application filed Dec. 14, 1900.)
(No Model.) 4 Sheets—Sheet 1.

No. 671,352. Patented Apr. 2, 1901.
E. RANKIN.
APPARATUS OR MACHINERY FOR LABELING CANS, BOTTLES, JARS, OR THE LIKE.
(Application filed Dec. 14, 1900.)
(No Model.) 4 Sheets—Sheet 2.
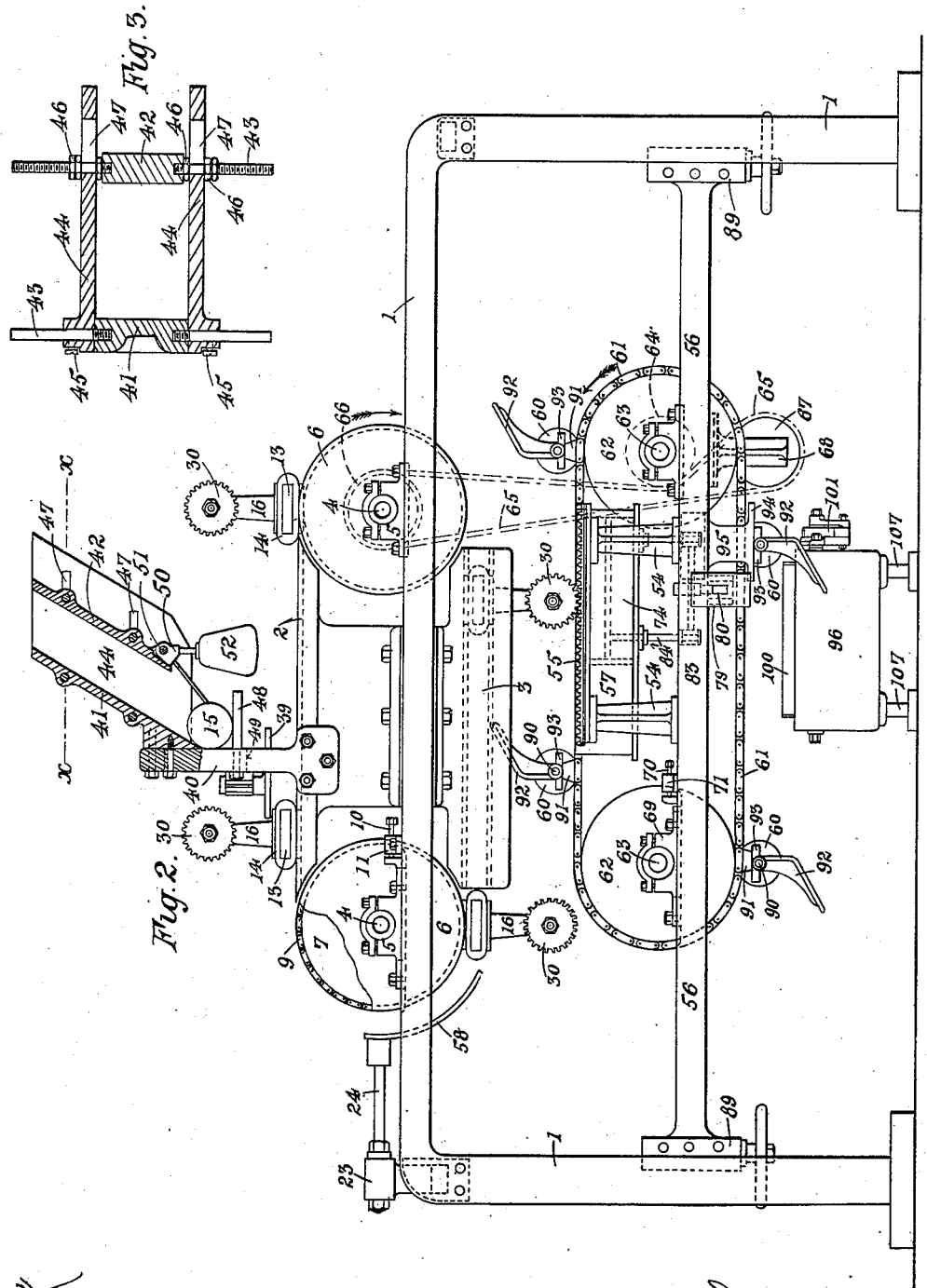

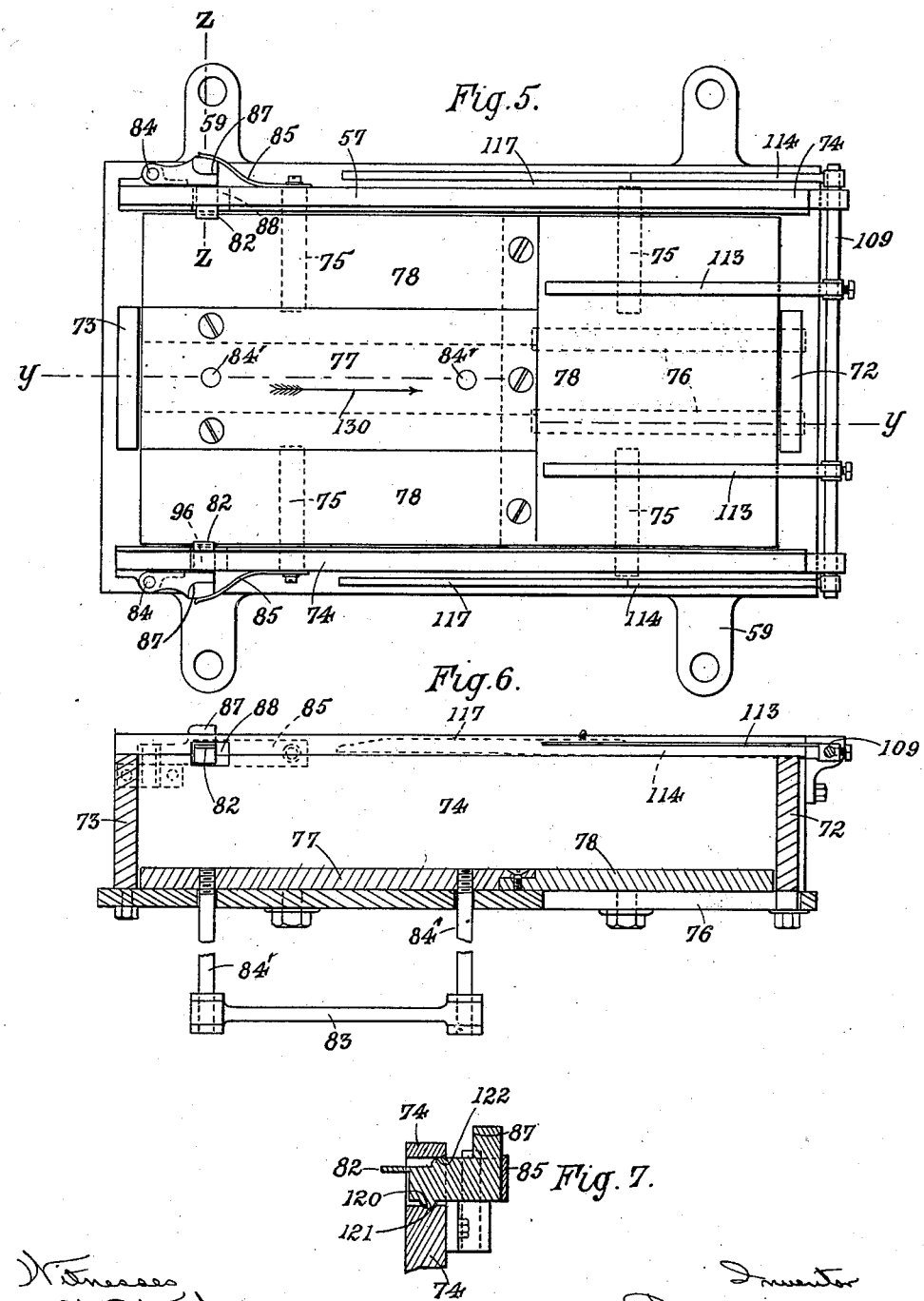

No. 671,352.  
Patented Apr. 2, 1901.

E. RANKIN.

APPARATUS OR MACHINERY FOR LABELING CANS, BOTTLES, JARS, OR THE LIKE.

(Application filed Dec. 14, 1900.)

(No Model.)  
4 Sheets—Sheet 4.

UNITED STATES PATENT OFFICE.

ERNEST RANKIN, OF LONDON, ENGLAND, ASSIGNOR OF ONE-HALF TO GEORGE SPICER, OF SAME PLACE.

APPARATUS OR MACHINERY FOR LABELING CANS, BOTTLES, JARS, OR THE LIKE.

SPECIFICATION forming part of Letters Patent No. 671,352, dated April 2, 1901.

Application filed December 14, 1900. Serial No. 39,874. (No model.)

*To all whom it may concern:*

Be it known that I, ERNEST RANKIN, a subject of the Queen of Great Britain, residing at London, England, have invented certain new and useful Improvements in Apparatus or Machinery for Labeling Cans, Bottles, Jars, or the Like, of which the following is a specification.

This invention relates to apparatus or machinery for labeling cans, bottles, jars, and the like and comprises the improvements hereinafter described.

The circular can, bottle, jar, or the like to be labeled, hereinafter for convenience referred to as a "can," is held between a pair of spring-controlled rotatable grippers or chucks and while so held is caused to roll over a label which has been previously gummed or pasted, thereby picking up the label and applying it closely around the can. For this purpose the rotatable chucks are mounted in bearings formed in head-stocks sliding on a suitable bar or rail which is connected to a traveling endless conveyer belt or chain which passes around pulleys or sprocket-wheels and is driven by any convenient means. A plurality of rails carrying such head-stocks are provided on the endless belt or chain, and the said rails are guided in grooves formed on the frame of the machine or parts thereby supported. The said chucks are opened to allow of the introduction between them of the can to be labeled by means of a stationary cam or wedge acting on the head-stocks, which are carried by the movement of the endless belt or chain, one on each side of the wedge or cam. By the action of the controlling-spring as soon as the head-stocks have passed the cam or wedge they immediately close and bring the chucks toward each other, thus gripping the can which has previously been fed from a hopper into proper position on an adjustable ledge. Another wedge is provided for opening the head-stocks and releasing the cans after the labels have been applied thereto.

The labels to be applied to the can are contained in a box placed beneath the endless belt or chain aforesaid, and the said box is placed in such a position that the cans are carried in succession over said box and in contact with the uppermost label contained therein. At each side of the label-box is a stationary toothed rack, and on the spindle of each gripper is a toothed wheel, which when the can is passing over the label-box becomes geared with the aforesaid rack, and thus causes the positive rotation of the chucks.

The gumming or pasting of the labels is effected by means of rollers carried by endless belts or chains first over the surface of a gumming-plate and then over the labels, one such gumming-roller passing over the label-box in front of each of the can-carrying chucks. Several gumming-plates are used, the same being mounted on the sides of a frame which is rotatable in bearings formed in the walls of a gumming or paste reservoir. The said frame is partially immersed in the gum or paste in the reservoir, and after the passage of a gumming-roller over the top plate, which is above the level of the paste or gum, the said frame is rotated to bring another gumming-plate to the top into position to be traversed by the next gumming-roller. The head-stocks can be moved laterally, and the label-box, gumming mechanism, and coacting parts can also be adjusted, as may be necessary, to accommodate cans of a different size.

Figure 4:
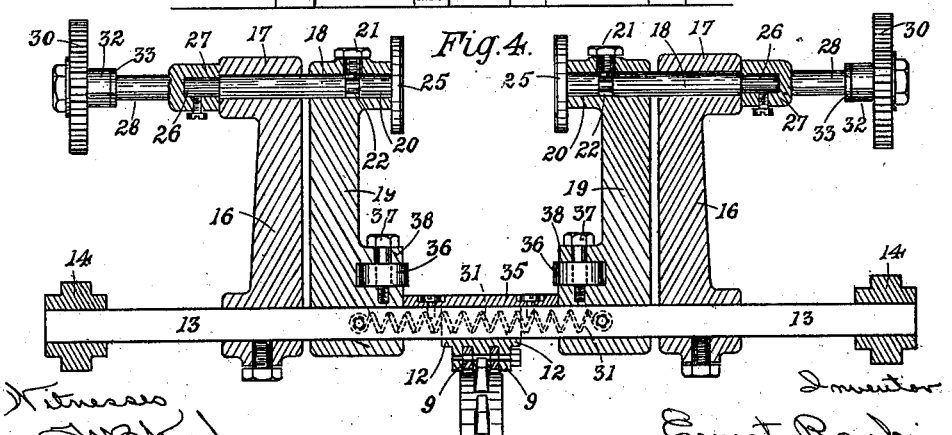
Figure 8:
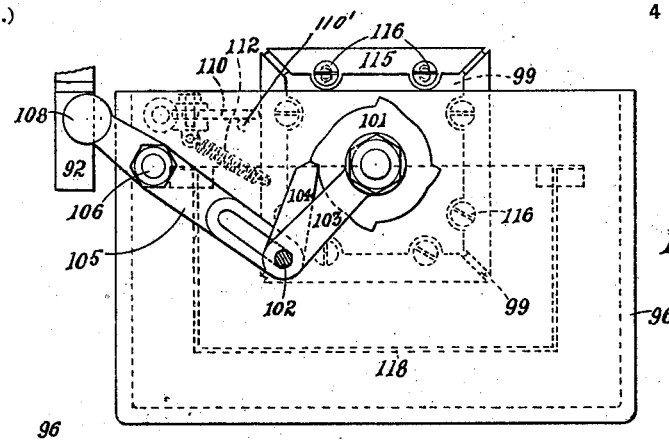
Figure 9:
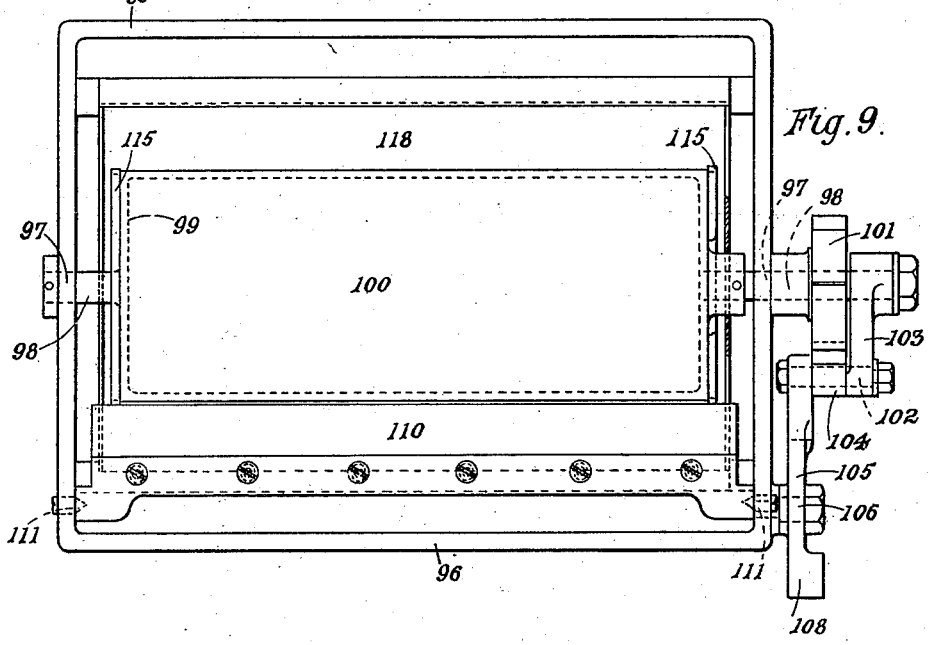

Referring to the accompanying drawings, Figure 1 is a front view with parts of the frame removed; and Fig. 2 is a right-hand side view of my improved machine, showing the feed-chute in central vertical section. Fig. 3 is a section taken on the line $x\, x$, Fig. 2, drawn to an enlarged scale. Fig. 4 is a central vertical section through the head-stocks, drawn to an enlarged scale. Fig. 5 is a plan view of the label-box, showing the walls opened out from the position shown in Fig. 1 to receive labels of a larger size. Fig. 6 shows a section taken on the line $y\, y$, Fig. 5. Fig. 7 is a detail view, hereinafter referred to, corresponding to a section taken on the line $z\, z$, Fig. 5. Figs. 8 and 9 are an end view and a plan, respectively, of the gum-reservoir.

Referring to Figs. 1 and 2, 1 is a frame supporting upper guideways 2 and lower guideways 3.

4 4 are rotatable shafts turning in bearings 5 5, supported by the frame. Upon each of the shafts 4 are mounted a sprocket-wheel 7 and grooved pulleys or disks 6, which form continuations of and unite the upper and lower guideways on each side of the machine, respectively. A driving-pulley 8, keyed to one of the said shafts 4, acts as a means for imparting motion to an endless conveyer-chain 9, passed around the sprocket-wheels 7, and the bearings supporting one shaft can be adjusted with relation to the bearings supporting the other shaft by means of set-screws 10, working in blocks 11, fast upon the frame 1, in order to give the requisite tension to the said chain 9. At convenient intervals along the length of the said chain blocks 12 are inserted, to which are secured bars or rails 13, provided with guide-shoes 14, adapted to travel in the guideways 2 3. The upper guideways are formed by grooves which engage the under surface only of the shoe as it travels across them; but the lower guideways comprise upper and lower grooves which engage the guide-shoe above and below, respectively, to relieve at times the chain from the weight of the rail 13 and attached parts or to resist any upward thrust which may be applied to the said rail. The rails 13 are preferably provided with T-shaped ends, by means of which they can be firmly secured to the guide-shoes 14, which when in position in the guideways hold the said rail from twisting and keep it parallel to the shaft 4. In Fig. 2 of the drawings four such rails are shown; but any convenient number may be used.

Upon each of the rails 13 are mounted sliding head-stocks 19, Figs. 1 and 4, each arranged to support a spindle 18 in a bearing 20, within which the said spindle can rotate, but is restrained from axial movement by means of a set-screw 21 engaging in a groove 22 formed in the said spindle. Each of the said spindles, moreover, extends through, is rotatable, and is capable of sliding axially within a bearing 17, arranged in a fixed head-stock 16, provided for the more efficient support of the said spindle, adjustably secured upon the rail 13. The inner ends of the spindles 18 have secured thereto gripping-plates or chucks 25, preferably faced with india-rubber to offer a better surface for more securely holding the can 15, and at their outer ends a reduced portion 26 is arranged to fit within a sleeve 27, formed on one end of an extension 28, carrying a gear-wheel 30. The sleeve 27 acts as a collar to prevent the spindle 18 drawing out of the fixed head-stock 16 when the sliding head-stocks 19 are drawn toward each other by the tension of a spring 31. The position of the gear-wheels 30 can be adjusted axially, for a purpose hereinafter pointed out, by inserting distance pieces or washers 32 between the shoulders 33 on the extensions 28 and the bosses of the said gear-wheels. For wide adjustments it is preferable to exchange the said extension-pieces for other extension-pieces of a more suitable size. I can, however, employ a continuous spindle of sufficient length, to which in this case the gear-wheel is secured by a feather and feather-way or a like axially-adjustable connection. Adjustable stops 35, Fig. 4, are provided upon the rails 13 between the sliding head-stocks 19 to assist or, in that case in which a continuous spindle is employed, to act in place of the sleeves 27.

Antifriction-rollers 36, mounted on pivot-pins 37, secured in lugs 38, provided on the sliding head-stocks, engage with wedge plates or cams arranged in convenient positions to force the sliding head-stocks outwardly against the force of the spring 31, and thus open the can-chucks, the closing together of the latter being effected by the operation of the said spring. One such cam 39 is detachably mounted beneath a frame 40, supporting a can-feed chute.

As shown in Figs. 2 and 3, the feed-chute comprises a front wall 41 and a rear wall 42, provided with laterally-extending rods 43, passing through suitable apertures arranged in the side walls 44, which can be maintained in the desired position along the said rods by means of set-screws 45 or screw-nuts 46. By this adjustment the lateral walls of the chute can be arranged to accommodate various lengths of cans. The rear wall 42 can be adjusted in accordance with the diameters of the cans by loosening the screw-nuts 46 on the correspondingly-screw-threaded rods 43 and moving the rear wall in the required direction, the rods 43 traveling in the slotted apertures 47, formed in the side walls. When in a suitable position, the wall can be secured by tightening the said screw-nuts.

The cans are delivered from the chute onto a table 48, adjustable vertically in slots 49, formed in the frame 40, and the said cans are pressed into contact with the said frame by one arm of a bent lever 50, pivoted at 51 and controlled by a weight 52, Fig. 2. Thus the position which the center of the can will occupy when in position on the table 48 can be adjusted with relation to the path of the center of the can-chucks, so that in the operation of the machine the frame 40 and table 48 will assure the support of the can in a position concentric with the chucks at the seizing-point. The rearward edge of the cam 39 is arranged with relation to the point of coincidence of the axes of the can and the chucks, so that the chucks 25 in their movement past the cam 39 are opened and remain open until the chucks 25 are concentric with the can. The rollers 36 then leave the cam, and the spring 31 draws the chucks together to seize the can, which is then carried away from the table 48, the lever 50 being lifted against the action of the weight 52 to release the can. The cans in the chute then drop until the lowermost can rests upon the table. The inclination of the chute is such that the weight of the cans prevents the lowermost can from rolling off the chute.

The gear-wheels 30 are adjusted in the manner above set forth, according to the length of the can between the chucks, to engage racks 55, supported on brackets 54, attached to a frame 56 and situated one on each side of a label-box 57 for the purpose of rotating the chucks in a positive manner while the can is moved over the said label-box.

A wedge or cam 58, mounted on an arm 24, adjustable in the bracket 23, attached to the frame 1, is arranged in the path of the rollers 36 to open the chucks 25 after the can has passed the label-box, and thus release the labeled can.

For the purpose of spreading gum or paste on the uppermost label in the label-box previous to the passage thereover of the can to be labeled a series of gumming-rollers 60, one for each pair of can-chucks, are mounted on endless conveyer-chains 61, passing around sprocket-wheels 62, which are fast on the spindles 63. The said endless chains 61 are driven by the pulley 64, fast on one spindle 63, by means of a driving-chain 65 running on the pulley 66, fast on the shaft 4. The driving-chain 65 also passes over the pulley 67, which is mounted on a spindle 29, carried by a block 34, adjustable in guideways in the bracket 68, depending from the frame 56, by means of the screw 59, Fig. 1, to regulate the tension of the driving-chain. To permit the endless chain 61 to be tightly stretched, the bearings 69 of the shaft 63 are adjustable by means of set-screws 70, working in blocks 71, fast on the frame.

The label-box 57, Figs. 5 and 6, rests, by means of the lugs 59, upon the frame 56 and is provided with a fixed front wall 73, side walls 74, movable in slots 75, and a rear wall 72, movable in the slots 76 to permit the adjustment of the size of the box to the size of the label to be delivered therefrom. The false bottom 77 of the box may have extension-leaves 78 secured thereto, as may be necessary to efficiently support the labels. A weight 79, arranged on a lever 80, pivoted at 81, normally presses the labels in the box into contact with the retaining-tongues 82 by means of the intermediate frame-piece 83 and rods 84', attached to the false bottom. The retaining-tongues 82 project through slots 88 in the sides of the box and are pivoted at 84. Springs 85 constantly tend to keep the said retaining-tongues above the labels. On the upper sides of the said tongues, lying in the path of pins 86, projecting from the sliding head-stocks, Fig. 1, inclined surfaces 87 are provided, which are engaged by the said pins 86 to temporarily withdraw the retaining-tongues from the label-box against the force of the springs 85. To cause a rising movement of the tongue 82 simultaneously with the withdrawal of the same from above the labels, a projection 120 is arranged to engage in a hollow or recess 121, formed in the bottom of the slot 88, Fig. 7. An inclined surface 122 is arranged to engage the roof of the said slot to force the said tongue downward upon the labels in the box when the tongue is pressed inward by its spring 85.

The bearings 69, supporting the spindles 63, the racks 55, the label-box 57, and the loaded lever 80, together with their attached parts, are mounted, as above stated, on a frame 56, which is supported on the main frame 1 by means of adjustment-slides 89 of any convenient construction in order to permit the adjustment, with respect to the path of the can-chucks, of the parts above referred to.

Each of the gumming-rollers 60 is supported in bearings 90, carried by blocks 91, inserted in the conveyer-chains 61. The said blocks 91 on one side of the machine are each provided with an extension 92, which in the operation of the machine is brought into engagement with a part attached to the gum or paste reservoir for a purpose hereinafter set forth. To support the said extensions 92 while in operation, each of these is provided with a projecting portion 93, which acts as a guide-shoe and slides along a fixed surface 94, formed on an arm 95, attached to the frame 56.

The paste or gum reservoir 96 is supported on columns 107, which may be adjusted vertically in any convenient manner following the adjustment of the frame 56, or, if preferred, a set of interchangeable reservoirs of varying heights may be provided. As shown in Figs. 8 and 9, bearings 97 are arranged in the ends of the gum-reservoir to support trunnions 98, extending from the ends of a frame 99, carrying the gumming-plates 100. Exterior to the box a ratchet-wheel 101 is mounted on the spindle 98, which, moreover, supports a link 103, the free end of which is provided with a pivot-pin 102, carrying a pawl 104, operated by a slotted lever 105, pivoted at 106, to cause the intermittent rotation of the said ratchet-wheel. The end 108 of the slotted lever 105 is arranged in the path of the extensions 92 on the gumming-roller arms above described. A scraper 110, supported upon the stop 110' and pivoted at 111, is drawn toward the gumming-plates 100 by a spring 112 to remove superfluous gum or paste from the said pads, and end pieces 115, adjustably secured to the frame 99 by screws 116, passing through slots, serve to hold the scraper out of actual contact with the gumming-plates at a suitable distance therefrom.

The pitch-line of the teeth of the gear-wheels 30 may be of equal diameter to the exterior surface of the can, so as to assure true rolling of the can upon the uppermost label contained in the label-box. It is, however, sometimes convenient to employ gear-wheels having a pitch-line of smaller diameter than the can, so that the circumferential velocity of the can is greater than its lineal velocity across the box. The label will thus be wholly wrapped about the can before the latter has passed from above the label-box—that is to say, the label is drawn toward the can. In this arrangement, Figs. 5 and 6, a spindle 109, supporting spring-arms 113, and levers 114, each having an inclined surface 117, is suitably mounted on the side walls 74 of the box. The can arriving at the label-box commences to wrap upon itself the label, the tongues 82, withdrawn by the pins 86 on the sliding head-stocks, Fig. 1, allowing the label to be removed. The pins 86 next operate on the inclined surfaces 117 of the levers 114, so as to press the spring-arms 113 down upon the uppermost label and offer a yielding resistance to the withdrawal of the said label, which is thus put under tension. This assures the label being closely and evenly applied around the can. It is necessary in this instance to form suitable recesses in the gum-rollers to permit them to pass over the arms. When gear-wheels of the same diameter as the can are employed, the spindle 109 and its attached parts may be removed or turned outwardly from above the labels in the box.

The operation of the machine is as follows: Motion being communicated to the endless chain 9, the head-stocks are respectively carried on either side of the cam 39, which then engages the rollers 36 and causes the opening of the chucks 25. A can 15 being in position on the table 48, Fig. 2, as the chucks arrive at a position concentric therewith the rollers 36 are carried clear of the said can and allow the spring 31 to operate to close the chucks and seize the can, which is thereby carried away, lifting the lever 50, which afterward swings back to prevent the escape of the next can delivered from the chute and retains the said can in position upon the table. The uppermost label in the box 57 previously to the passage of a can over the label-box is coated with gum or paste conveyed thereto by one of the rollers 60, carried by the conveyer-chains 61. After each roller 60 has passed over the gum-reservoir 96 the extension 92 meets the end 108 of the lever 105 and depresses the same, so that the pawl 104 is lifted and turns the frame 99 through one-quarter of a revolution. This brings a fresh gumming-plate 100 uppermost to supply gum to the next succeeding roller 60. As the gumming-plates are lifted out of the bath of gum or paste 118 the scraper 110 removes the superfluous gum, the thickness of the layer of gum allowed to remain upon the gum-pad being regulated by the adjustment of the end pieces 115, attached to the pad-frame 99 by set-screws 116, passing through slotted holes formed in the said end pieces. The tongues 82 prevent the said label from being carried away by the gumming-roller 60, but are withdrawn from above the label by the pins 86 on the sliding head-stocks engaging the inclined surfaces 87, thus leaving the label free to be pressed into contact with the said can by the operation of the weighted lever 80, acting through the rods 84 and false bottom 77. In the continued operation of the machine the chucks 25, holding the can 15, pass from the upper guideway 2 around the grooved pulleys 6 to the lower guideway 3 and bring the can immediately above the edge of the label-box. The gear-wheels 30 at this time engage with the racks 55 and cause the positive rotation of the chucks, while the can is carried along the label-box in the direction indicated by the arrow 130, Fig. 5. The label during this operation is picked up by the can and wrapped around the same, so that on the opening of the chucks 25 by the engagement of the rollers 36 with the cam 58 the labeled can is deposited onto a suitable table or chute (not shown in the drawings) and conveyed away from the machine.

What I claim is—

1. In a labeling-machine, the combination of an endless conveyer, a rail carried thereby, head-stocks sliding on said rail, rotatable chucks carried by said head-stocks, a cam for opening said head-stocks to allow of the introduction of a can between the chucks, a spring for drawing said chucks toward each other to seize the can, and a second cam for reopening the chucks to release the can, substantially as described.

2. In a labeling-machine, the combination of an endless conveyer, a rail carried thereby, head-stocks sliding on said rail, rotatable chucks carried by said head-stocks, an upper guideway, a lower guideway, guide-shoes secured to said rail and traveling in said guideways, a cam for opening said head-stocks to allow of the introduction of a can between the chucks, a spring for drawing said chucks toward each other to seize the can, and a second cam for reopening the chucks, to release the can, substantially as described.

3. In a labeling-machine, the combination of an endless conveyer, a rail carried thereby, head-stocks sliding on said rail, rotatable chucks carried by said head-stocks, an upper guideway, a lower guideway, rotatable grooved disks forming the continuations of and uniting the guideways on opposite sides of the machine respectively, guide-shoes secured to said rail and traveling in said guideways, a cam for opening said head-stocks to allow of the introduction of a can between the chucks, a spring for drawing said chucks toward each other to seize the can, and a second cam for reopening the chucks to release the can, substantially as described.

4. In a labeling-machine, the combination of an endless conveyer, a rail carried thereby, fixed head-stocks adjustably mounted on said rail, head-stocks sliding on said rail, rotatable chucks carried by spindles supported in bearings arranged in the said sliding and fixed head-stocks, means for closing said chucks to seize a can, and means for opening the head-stocks, to release the can, substantially as described.

5. In a labeling-machine, the combination of an endless conveyer, a rail carried thereby, head-stocks sliding on said rail, chucks rotatably mounted in bearings carried by said head-stocks, a spring drawing said sliding head-stocks toward each other, adjustable stops for limiting the motion of the said head-stocks toward each other, a cam for separating the said head-stocks against the action of the said spring to allow of introducing a can between the head-stocks, and another cam for opening the head-stocks to release the can, substantially as described.

6. In a labeling-machine the combination of an endless conveyer, a rail carried thereby, head-stocks sliding on said rail, chucks rotatably mounted in bearings carried by said head-stocks, a spring drawing said sliding head-stocks toward each other, stationary cams, rollers pivotally mounted on said head-stocks and arranged to engage said cams for separating said head-stocks against the action of said spring, substantially as described.

7. In a labeling-machine, the combination of an endless conveyer, a rail carried thereby, spring-controlled adjustable head-stocks sliding on said rail, chucks carried by said head-stocks, means for delivering cans to said chucks, a cam for opening the head-stocks to receive the cans, a label-box, means for gumming the labels thereon, means for revolving the chucks as they convey the cans over the label-box, and a cam for opening the head-stocks to release the cans, substantially as described.

8. The combination in a labeling-machine, of rotatable chucks carried by an endless conveyer, a feed-chute provided with adjustable side and rear walls, a frame supporting an adjustable delivery-table, a pivoted lever controlled by a weight and arranged to hold the cans delivered in succession upon the said table in accurately-corresponding positions, and means to cause said chucks to open and to seize the said cans at predetermined times, substantially as described.

9. In a labeling-machine, the combination of an endless conveyer, a rail carried thereby, head-stocks sliding on said rail, chucks mounted on spindles carried in bearings in said head-stocks, gear-wheels adjustable axially on said spindles, and racks engaging the said gear-wheels to cause the rotation of the chucks substantially as described.

10. In a labeling-machine, the combination of an endless conveyer carrying rotatable chucks, a frame adjustable relatively to the path of said rotatable chucks, a label-box mounted thereon, and a second endless conveyer carrying gumming-rollers over said label-box in advance of the rotatable chucks, substantially as described.

11. In a labeling-machine, the combination of a label-box having adjustable side and end walls, a false bottom provided with extension-leaves, a weighted lever connected by a frame-piece and rods to the said false bottom and spring-controlled tongues arranged to retain the labels contained within the said box, substantially as described.

12. In combination in a labeling-machine, head-stocks carried by a traveling conveyer, pins projecting from said head-stocks, a label-box, spring-controlled tongues pivotally supported upon said label-box, and inclined surfaces formed upon the said tongues arranged in the path of the said pins, substantially as described.

13. In combination in a labeling-machine, a label-box, a spring-controlled tongue pivotally supported upon and entering the said box through a slot in the wall thereof, means for moving said tongue laterally, and interengaging inclined surfaces arranged upon the sides of the slot and the said tongue respectively, to impart a vertical movement to said tongue simultaneously with its movement laterally, substantially as described.

14. The combination in a labeling-machine, of a label-box, spring-controlled tongues for retaining the labels contained within the said box, a carrier provided with pins arranged to withdraw said tongues, levers fast upon a pivotally-mounted spindle, inclined surfaces on said levers arranged in the path of said pins, and spring-tongues secured upon the said spindle, substantially as described.

15. In a labeling-machine, the combination of a traveling conveyer, a rail connected to the conveyer, adjustable head-stocks sliding on said rail, means for sliding the said head-stocks, stops to limit the inward and outward movements of the head-stocks, spindles rotatably mounted in said head-stocks, chucks supported on said spindles, gear-wheels adjustable axially along said spindles, a can-feed chute, means for adjusting the walls of said chute to accommodate cans of different sizes, a frame adjustable with relation to the path of the chucks, a label-box mounted on the said adjustable frame, means for adjusting the walls of said box in accordance with the sizes of the labels to be delivered therefrom, and racks secured on said frame to engage the gear-wheels to cause the rotation of the chucks, substantially as described.

16. In a labeling-machine, the combination of a gum-reservoir, gumming-plates, a rotatable frame carrying said plates, rollers movable over said plates, a supporting-arm, an extension carried by said arm supporting the said rollers, a guide-shoe on said extension, a fixed surface engaging said shoe to form a support for the said extension, and a lever operating to rotate the frame on which the gumming-plates are mounted, and mechanism for operating the said lever, substantially as described.

17. In a labeling-machine, a gum-reservoir, a frame rotatably mounted within said reservoir, gumming-plates carried by said frame, end pieces adjustably mounted on said frame, a pivotally-mounted scraper, and a spring for holding said scraper in contact with the said end pieces, substantially as described.

In testimony whereof I have hereunto set my hand in presence of two subscribing witnesses.

ERNEST RANKIN.

Witnesses:
JOHN T. KNOWLES,
HERBERT A. BEESTON.